Jan. 10, 1961  B. B. WILLIS  2,967,723
TUBE COUPLING
Filed July 1, 1957

INVENTOR.
BARRY B. WILLIS
BY Lyon & Lyon
ATTORNEYS

United States Patent Office 2,967,723
Patented Jan. 10, 1961

2,967,723

TUBE COUPLING

Barry B. Willis, La Canada, Calif., assignor to On Mark Couplings, Inc., Los Angeles, Calif., a corporation of California Filed July 1, 1957, Ser. No. 669,040

2 Claims. (Cl. 285—233)

This invention relates to tube couplings, and included in the objects of this invention are:

First, to provide a tube coupling which is primarily designed to seal and retain a confronting pair of tube sections having external annular beads adjacent their ends, and is so arranged as to permit limited angular displacement of the tube sections without eccentric loads on the sealing means which would cause leakage.

Second, to provide a tube coupling which incorporates a novel segmental seal ring abutment means mounted in the axial ends of the coupling, and radially expandable to pass over the annular tubing beads and contractible to engage the tubing to restrain the seal ring.

Third, to provide a tube coupling which utilizes O-rings to effect sealing connections with the tube sections, and which provides tapering seats for the O-rings arranged to increase compression of the O-rings upon increase in the pressure within the tube sections.

With the above and other objects in view, as may appear hereinafter, reference is directed to the accompanying drawings in which.

Figure 1:
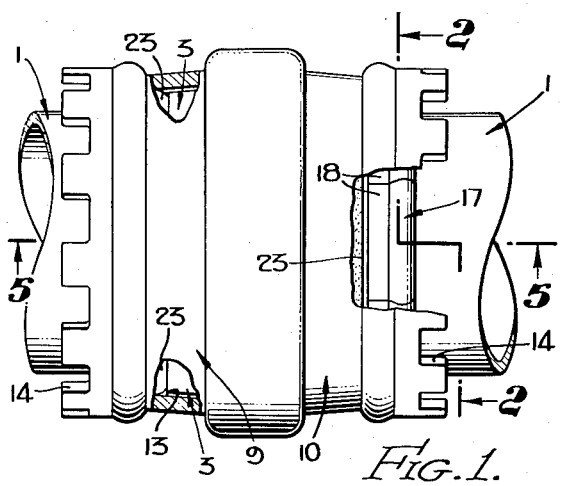
Figure 1 is a side view of the tube coupling shown joined to confronting tube sections, the tubes being shown fragmentarily, and a portion of the coupling broken away to illustrate one of the segmental abutment rings.
Figure 2:
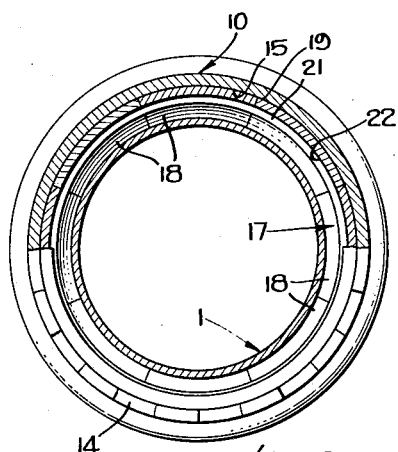
Fig. 2 is a transverse sectional view through 2—2 of Fig. 1, showing particularly the segmental abutment ring construction.
Figure 4:
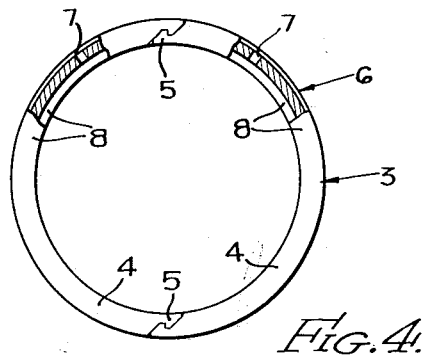
Fig. 4 is a partial end view, partial sectional view of the retainer ring.
Figure 3:
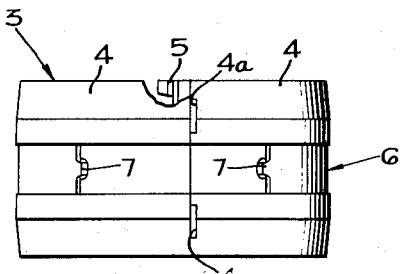
Fig. 3 is an elevational view of the retainer ring.

The tube coupling is intended to join together a pair of confronting tube sections 1 of the type provided with rolled external beads 2 adjacent their extremities.

The tube coupling includes a retainer ring 3 formed by a pair of complementary semicylindrical segments 4 which are provided with diametrically disposed, stepped, interlocking, beveled ends forming hook elements 5, so arranged that the two segments may be fitted together to resist hoop stress or sprung apart for assembly around the confronting ends of a pair of tube sections 1. The segments 4 are held in their interconnected position by means of a spring band 6 set in a shallow channel and having hook ends 7 fitting in accommodation holes provided in the segments 4 at either side of one of their interlocking ends.

The set of interlocking hook elements 5 covered by the central portion of the spring band 6 forms, in effect, a hinge, whereas the other set of hook elements 5 located between the extremities of the spring band 6 forms, in effect, a latch. The retainer segments may thus be unlatched from each other and separated, so as to be slipped over the ends of the confronting tubing sections 1 and then latched together. To facilitate unlatching of the sections, their confronting ends between the extremities of the spring band 6 may be provided with screw-driver slots 4a.

The axial extremities of the retainer ring 3 are provided with internal ribs 8, which radially overlie the beads 2 to retain the tube sections against axial separation.

The retainer ring 3 fits loosely within a pair of annular body members 9 and 10. The body members are provided with a screw-threaded connection 11 substantially centered over the retainer ring. A seal washer 12 is interposed in the screw-threaded connection 11.

The body members 9 and 10 project axially beyond the retainer ring 3 and internally converge toward the tube sections 1 to form internally tapered seal ring seat portions 13. The body members 9 and 10 project axially beyond the seat portions, terminating in castellated ends 14 to facilitate screw-threading the body members 9 and 10 together.

Adjacent the castellated ends 14, each body member 9 and 10 is provided with an annular internal journal channel 15, and axially inward from each journal channel is a clearance channel 16. Fitted in each journal channel 15 and clearance channel 16 is a segmental abutment or back-up ring 17. Each abutment or back-up ring comprises a plurality of arcuate segments 18, the circumferential ends of which are in contiguous relation with each other.

Each segment 18 includes a bearing portion 19 which is capable of limited rocking movement in the channel 15. Radially inward of each bearing portion 19 is an internal groove 20. The internal grooves of the segments form an annular groove, axially offset from the journal channel 15. The annular groove receives a split loop spring 21 which urges the bearing portions 19 into the journal channel 15. Each segment 18 extends radially and axially inward toward a tube section 1 and toward the corresponding axial end of the retainer ring 3.

Compositely, the segments 18 form an annular abutment shoulder 22 confronting but spaced from the corresponding axial end of the retainer ring 3. An O-ring seal 23 is mounted between each axial end of the retainer ring 3 and corresponding abutment shoulder 22, and is of such dimension as to wedge between a tube section 1 and seal ring seat portion 13.

The tube coupling is assembled as follows:

The body members 9 and 10 and the O-rings 23 are slipped axially over their respective tube sections 1. The retainer ring 3 is then slipped over the confronting ends of the tube sections 1 so as to bridge between the beads 2 with the internal ribs 8 positioned axially beyond the beads. The body members 9 and 10 are then brought together and screw-threaded. In the course of this operation, the O-rings 23 are wedged between the seal ring seat portions 13 and the tube sections to form seals. The body members 9 and 10 are, of course, tightened sufficiently to be sealed by the washer 12.

Figure 5:
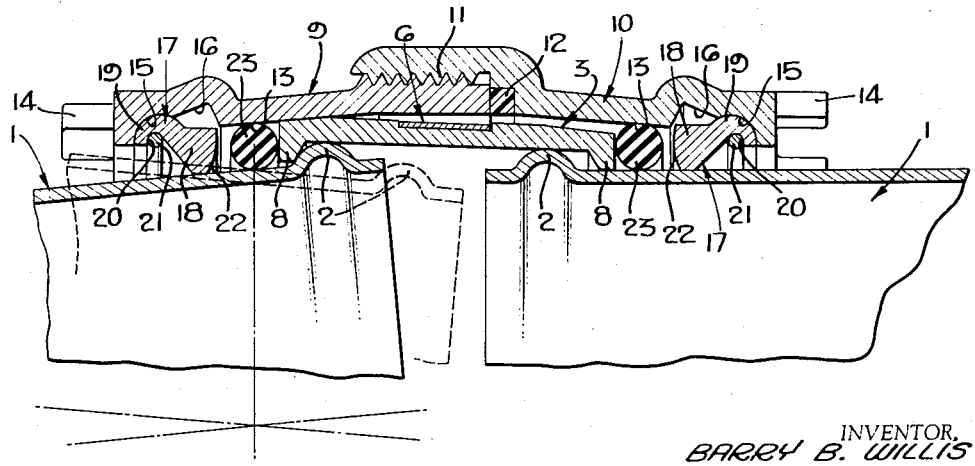
Fig. 5 is an enlarged fragmentary, longitudinal, sectional view through 5—5 of Fig. 1.

It will be observed that clearance is provided between the retainer ring 3 and body members 9 and 10 as well as between the retainer ring and tube sections 1. The retainer ring 3 may therefore be displaced laterally and the tube sections 1 may be displaced angularly a nominal amount, as indicated by the solid line and broken line angular positions of one of the tube sections shown in Fig. 5. It will be observed that within this range of movement each tube section 1 may pivot in the plane of its O-ring 23 without appreciable lateral displacement. As a consequence, the O-ring is not unduly crushed on the one side and relieved on the diametrically opposite side to cause leakage.

By reason of the fact that the seal ring seat portions 13 taper toward the tube sections 1, the seal rings tend to be compressed in proportion to the internal pressure. That is, the internal pressure tends to force the seal rings towards the abutment rings 17 and in the direction of convergence of the seal ring seats.

It will be observed that the segmental abutment rings 17 remain permanently within their respective body members 9 and 10, but each segment 18 is capable of limited pivotal movement to permit the body members to be slipped axially over the beads 2. By reason of the offset position of the spring 21, the segments 18 are urged radially inwardly toward the tube section 1, but permit the segments to yield to angular displacement of the tube section.

It will also be observed that the tube sections 1 are capable of limited axial displacement.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In a coupling for interconnecting two tubing members having circumferential enlargements forming rearward shoulders near the tubing ends, including a retainer ring to bridge the ends of the two tubing members with inner circumferential shoulders of the retainer ring in engagement with said rearward shoulders to prevent separation of the two tubing members, said retainer ring being expansile to clear said tubing enlargements for the purpose of assembly, a coupling body to confine said retainer ring, said coupling body being made in separable sections for the purpose of assembly and having inner circumferential shoulders at its opposite ends dimensioned to clear said enlargements for the purpose of assembly, a pair of sealing rings to embrace the respective tubing members inside the coupling body adjacent the opposite ends of the retainer ring, said sealing rings being expansile to clear the tubing enlargements for the purpose of assembly, and a pair of back-up rings for said sealing rings in engagement with the inner circumferential shoulders respectively of the coupling body, the improvement comprising: said coupling body having two inner circumferential bearing channels for cooperation with said back-up rings respectively; each of said back-up rings being formed by a plurality of segments, the axially outward ends of said segments being in pivotal engagement with said bearing channels for swinging movement of the segments between radially outward positions to clear the tubing enlargements for the purpose of assembly and radially inward positions to back-up said sealing rings; and spring means mounted in each of said back-up rings to urge said segments radially outward into said bearing channels.

2. The improvement as set forth in claim 1 in which each of said spring means is positioned eccentrically of the pivot axes of the corresponding ring segments to create moments to urge the ring segments to swing radially inward against the corresponding tubing member.

References Cited in the file of this patent

UNITED STATES PATENTS

| | | |
|---|---|---|
| 755,442 | Brickell | Mar. 22, 1904 |
| 1,622,768 | Cook et al. | Mar. 29, 1927 |
| 1,928,821 | Santiago | Oct. 3, 1933 |
| 2,346,051 | Seamark | Apr. 4, 1944 |
| 2,479,960 | Osborn | Aug. 23, 1949 |
| 2,778,661 | Leighton | Jan. 22, 1957 |
| 2,781,207 | Detweiler et al. | Feb. 12, 1957 |
| 2,826,437 | Detweiler | Mar. 11, 1958 |
| 2,883,211 | Grass | Apr. 21, 1959 |

FOREIGN PATENTS

| | | |
|---|---|---|
| 382,966 | Great Britain | Nov. 10, 1932 |